(12) United States Patent
Dadig et al.

(10) Patent No.: US 12,247,734 B2
(45) Date of Patent: Mar. 11, 2025

(54) ROTATING ELECTRICAL CONNECTION WITH LOCKING AXIAL AND RADIAL POSITIONS FOR USE IN WELDING AND CUTTING DEVICES

(71) Applicant: American Torch Tip, Co., Bradenton, FL (US)

(72) Inventors: Steven E Dadig, Lakewood Ranch, FL (US); Juan Reynaldo Solis, Jr., Bradenton, FL (US)

( * ) Notice: Subject to any disclaimer, the term of this patent is extended or adjusted under 35 U.S.C. 154(b) by 905 days.

(21) Appl. No.: 16/556,822

(22) Filed: Aug. 30, 2019

(65) Prior Publication Data

US 2021/0063014 A1 Mar. 4, 2021

(51) Int. Cl.
| | |
|---|---|
| *F23D 14/54* | (2006.01) |
| *B23K 9/32* | (2006.01) |
| *F23D 14/40* | (2006.01) |
| *B23K 9/167* | (2006.01) |
| *B23K 9/173* | (2006.01) |
| *B23K 9/29* | (2006.01) |

(52) U.S. Cl.
CPC ............. *F23D 14/54* (2013.01); *F23D 14/40* (2013.01)

(58) Field of Classification Search
CPC ........ B23K 9/167; B23K 9/173; B23K 9/295; B23K 9/296; B23K 9/323; F23D 14/40; F23D 14/54
See application file for complete search history.

(56) References Cited

U.S. PATENT DOCUMENTS

| | | | |
|---|---|---|---|
| 2,529,552 A | | 5/1946 | Herold |
| 3,279,701 A | * | 10/1966 | Tage ....................... F23D 14/38 |
| | | | 239/413 |
| 3,413,018 A | * | 11/1968 | Francis ................. F16L 37/252 |
| | | | 285/86 |
| 3,659,250 A | | 4/1972 | Horton |
| 4,049,943 A | * | 9/1977 | Pratt ...................... B23K 9/323 |
| | | | 219/136 |
| 4,050,149 A | | 9/1977 | Storck |
| 4,116,572 A | * | 9/1978 | Heldmann ............ F16D 1/0864 |
| | | | 403/41 |
| 4,549,068 A | | 10/1985 | Kensrue |
| 5,260,546 A | | 11/1993 | Ingwersen et al. |

(Continued)

FOREIGN PATENT DOCUMENTS

| | | |
|---|---|---|
| CN | 108907412 A | 11/2018 |
| JP | 2004167583 A  *  6/2004 | |

(Continued)

*Primary Examiner* — Michael G Hoang
*Assistant Examiner* — Logan P Jones
(74) *Attorney, Agent, or Firm* — Accel IP Law, PLLC; Ferdinand M. Romano

(57) ABSTRACT

A rotatable and removable connection for use in a welding torch assembly that allows for the gooseneck to be removeable and rotatable by the use of an interference member that allows the welding torch assembly to enter a locked, unlocked and partially lock state by moving the interface member about the central axis of the welding torch assembly, the partially lock state allows for rotation of the gooseneck without allowing for removal of the gooseneck, and the electrical connection provides electrical conduction via a conduction member that is independent form the locking features of the welding torch assembly.

25 Claims, 14 Drawing Sheets

(56) References Cited

U.S. PATENT DOCUMENTS

| | | |
|---|---|---|
| 5,384,447 A | 1/1995 | Raloff et al. |
| 5,595,671 A | 1/1997 | David |
| 5,984,709 A | 11/1999 | Zink |
| 6,206,432 B1 * | 3/2001 | Kamiyama ............. F16L 37/23 |
| | | 285/348 |
| 8,256,803 B2 * | 9/2012 | Takahashi ............... F16L 37/34 |
| | | 285/86 |
| 2002/0139782 A1 | 10/2002 | Onitsuka |
| 2004/0068911 A1 | 4/2004 | Schurtenberger |
| 2010/0012637 A1 | 1/2010 | Jaeger |
| 2010/0029145 A1 | 2/2010 | Balsells |
| 2012/0125903 A1 | 5/2012 | Izutani |
| 2014/0131336 A1 | 5/2014 | Jacques |
| 2020/0069316 A1 * | 3/2020 | DeSoutter .......... A61B 17/1633 |

FOREIGN PATENT DOCUMENTS

| | | | |
|---|---|---|---|
| WO | 2010028645 A1 | 3/2010 | |
| WO | WO-2010135752 A2 * | 12/2010 | ............. B23K 9/323 |

\* cited by examiner

ROTATING ELECTRICAL CONNECTION WITH LOCKING AXIAL AND RADIAL POSITIONS FOR USE IN WELDING AND CUTTING DEVICES

BACKGROUND OF THE INVENTION

A. Field of Invention

The present invention is in the technical field of electrical connections for use in electrical welding and cutting devices. More particularly, the present invention is in the technical field of welding torches for use in gas metal arc welding (GMAW) or as commonly known "MIG" welding applications. Additionally, the present invention can be used in other electrical welding and cutting applications including but not limited to plasma cutting torches and tungsten inert gas welding (TIG) welding torches.

B. Background of the Invention

MIG welding torches have been used in the metal fabrication industry for many years and various manufactures have produced many variations of welding torch bodies. A basic MIG welding torch is presented in FIG. 1 of U.S. Pat. No. 3,529,128 by Cruz (hereinafter '128 patent). As presented in FIG. 1 of the '128 patent, a MIG welding torch 10 has a tubular body 12, a switch actuator 17, a curved insulated neck 18, and a welding head 16. The welding torch presented in the '128 patent is a relatively early design that does not have ergonomic features, removability or rotatability of the insulated neck 18. The ability to remove and or rotate the insulated neck 18 present in the '128 patent, which has come to be commonly known as a "gooseneck," has since been attempted by various manufactures. The majority of removable and rotatable goosenecks use a variation of a locking collar, typically in the form of an annular cavity, that accepts a circular or tubular end of the gooseneck. A typical variation of this locking collar design can be seen in FIG. 1, a slot 1 is cut into the receiver body 2, thereby creating the two halves of the compressive collar 3, one side is threaded 4 and the other has design feature 5 to accept a screw. When a screw (not shown) is used to pull the two halves of the compressive collar 3 together, an installed gooseneck (not shown) will be locked in place. This type of design exclusively relies on the compressive force created by pulling the two halves of the compressive collar 3 together. In order to produce enough compressive force in the compressive collar 3, a tool is needed to tighten the screw used in designs of this type.

Another variation of the compressive collar design was used in the "Quick Load®" gooseneck manufactured by Tregaskiss. In this variation of the compressive collar design, a lever was used to exert the compressive force on the gooseneck in same way that lever locks are use in bicycle seat collars. In this design, and all other locking collar designs, electrical conduction is achieved by contact between the cylindrical portion of the gooseneck and the annular portion of the compressive collar. The quality of the electrical connection is dependent on the compressive force between the cylindrical portion of the gooseneck and the compressive collar of the "Quick Load®" torch. Regardless of the method used to create the compressive force, a screw or lever, compressive forces are generated between the compressive collar and mating end of the gooseneck. Additionally, the internal bore of the compressive collar and mating end of the gooseneck are smooth and thus require considerable amounts of torque to be exerted on the screw or lever used to create the compression needed for electrical conduction. Often, designs that use screws are overtightened which leads to damaged or stripped threads in the compressive collar, thus preventing the locking of the gooseneck or proper electrical conduction. Overtightening is not necessary to wear out the threads in the compressive collar, which are typically made of brass or copper, because the screws used to tighten the collar are of a much harder material. Typically, the screws used are Allen Head screws that are grade 8.8 or 12.9. The act of locking the gooseneck requires the screws to stretch the threads of the locking collar, which will wear or damage the threads of the compressive collar over the course of repeated usage due to the difference in material properties between the locking screw and compressive collar.

The material used for the mating end of the gooseneck is typically a copper rod or tubing. The copper used in the gooseneck is softer, has a lower modulus of elasticity and yield stress, and can deform and yield to the brass compressive collar when the screw or lever is tightened. The compressive collar has a fixed amount of travel that is defined by the slit or gap between the two halves of the compressive collar. If the mating end of the gooseneck yields or deforms past the travel allowed by the gap between the two halves of the compressive collar, the gooseneck will not be locked, nor will there be a sufficient compression for an electrical connection. The amount of current used in hand held MIG welding can be 400 amps or higher. Arching between the gooseneck and welding torch body can occur when there is a poor electrical connection, and at the currents used in welding torches, severe damage can occur.

End users of MIG welding torches have been known to use the welding torches to knock off slag from fresh welds, which can exert rotational and or transverse forces on the gooseneck. Repeated use of the MIG welding torch in this manner can increase the speed at which the compressive collar and mating end of the gooseneck wear. The combination of failure modes such as the deformation of the mating end of the gooseneck, thread wear, and deformation of the locking collar can be exacerbated by the use of the welding torch body as a hammer by the end user. This practice uses the gooseneck as the working end of the "hammer" and will introduce additional stresses to gooseneck.

BRIEF DESCRIPTION

The present invention provides a removable and rotatable gooseneck, which in combination with a mating welding torch body, is used as a MIG welding torch that can be quickly locked and released without the use of a compressive collar that relies on pulling two halves of the compressive collar together to create a compressive force on a cylindrical or tubular mating end of a gooseneck to create an electrical connection capable to conduct at least 400 amps. One embodiment of the present invention is a MIG welding torch assembly that has a gooseneck which has a distal and proximal end. The consumables of the MIG welding torch are installed on the proximal end of the gooseneck and the distal end of the gooseneck attaches to the welding torch body. The distal end of the gooseneck has several mechanical locking features that lock the gooseneck, when installed in the welding torch body, from rotating or from being moved in the axial direction relative to the central axis of the welding torch body. In this embodiment the distal end of the gooseneck is tubular and serves as the electrical connection between the gooseneck and a conduction member within the torch body. Abutting the electrical connection is a sealing feature which is machined onto the distal end of the gooseneck to prevent leakage of shielding gas when installed in the welding torch body by installation of an O-ring. The distal end of the gooseneck has an undercut of specified width machined around the circumference of the distal end. Centered axially within the undercut are a series of spherical counter bores which are machined concentrically to form a ring of spherical counterbores around the circumference of the distal end of the gooseneck. The distal end of the gooseneck is tubular and transitions from a minimum outer diameter to a maximum outer diameter via a taper in the axial direction towards the proximal end of the gooseneck. The taper assists in installation into the welding torch body by providing initial clearance between the distal end of the gooseneck and the locking members of the welding torch body.

The welding torch body in accordance with the present embodiment of this invention, is configured to accept the distal end of the corresponding gooseneck. The distal end of the gooseneck is installed inside of the receiving member of the welding torch body. In this embodiment the receiving member is an annular cavity configured to receive the distal end of the gooseneck with minimal frictional resistance. The welding torch body has a series of locking members, which in this embodiment are a series of metal balls or spheres. The receiving member is machined to include a series of limiting members which in this embodiment are a series of conical counter bores that have minimum diameter that is not large enough for the metal balls to pass through but large enough to allow a portion of the metal ball or sphere to protrude through the inner wall of the receiving member, thereby limiting the radial travel of the metal balls relative to the central axis of the welding torch body. The conical counterbores are arranged concentrically around the circumference of the receiving member in radial increments that are compatible or coincide with radial positions of the spherical counter bores in the rotatable gooseneck. The metal balls are positioned inside of the limiting members and held in place by an interference member in the form of a metal conical ring configured to travel in the axial direction about the central axis of the welding torch body such that the conical ring can produce a locked and unlocked position by allowing the metal balls to be pushed radially outward and a locked position by pushing the metal balls radially inward.

BRIEF DESCRIPTION OF THE DRAWINGS

Figures are not drawn to scale. The figures depict one or more embodiments of the present invention. The features, aspects and advantages of the present disclosure will become better understood when the following detailed description is read with reference to the accompanying drawings in which like characters represent like parts throughout the drawings, wherein.

DETAILED DESCRIPTION OF THE INVENTION

Figure 1:
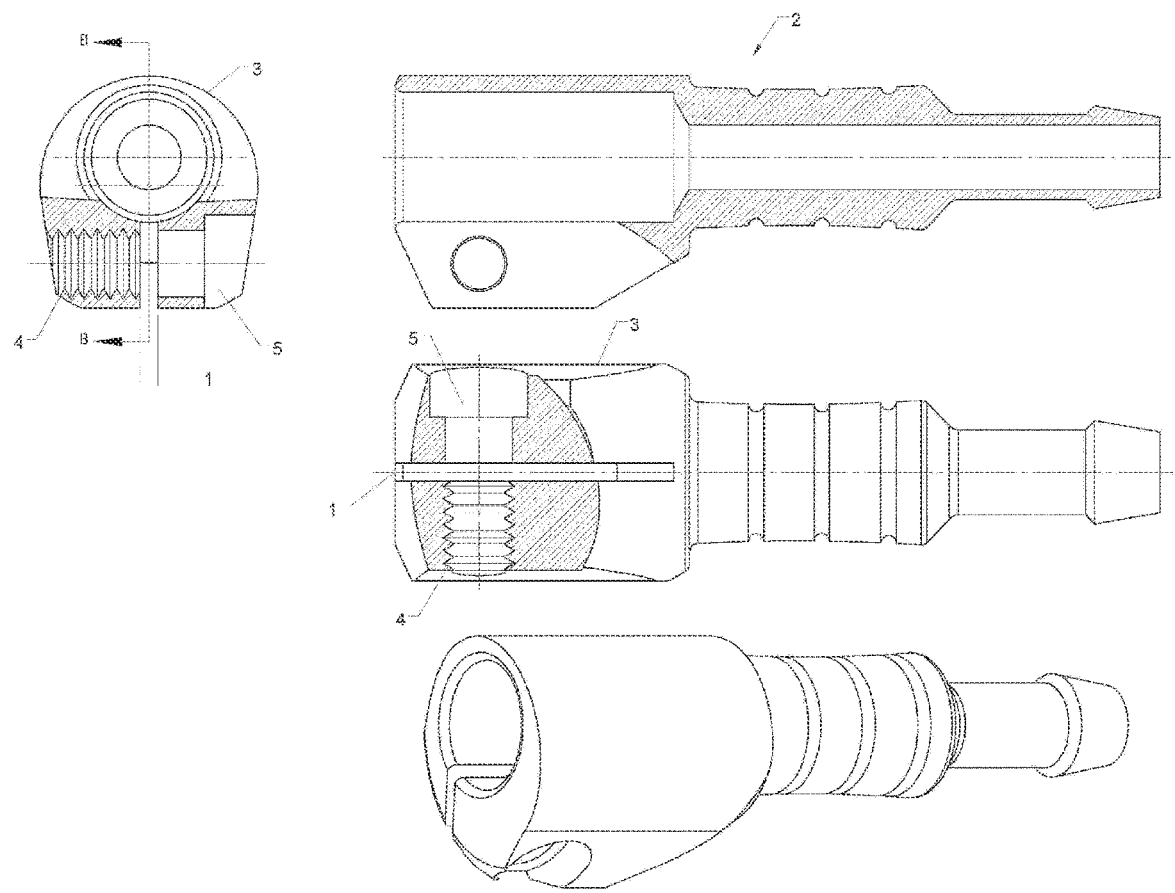
FIG. 1 is a component of a prior art welding torch that utilizes a compressive collar that relies on a screw to pull the two halves of the compressive collar together.

Referring now to the drawings, wherein like reference numerals designate identical or corresponding parts throughout the several views, embodiments of the invention are shown. The present invention is a rotating electrical connection with locking axial and radial positions for use in welding and cutting devices.

Figure 2:
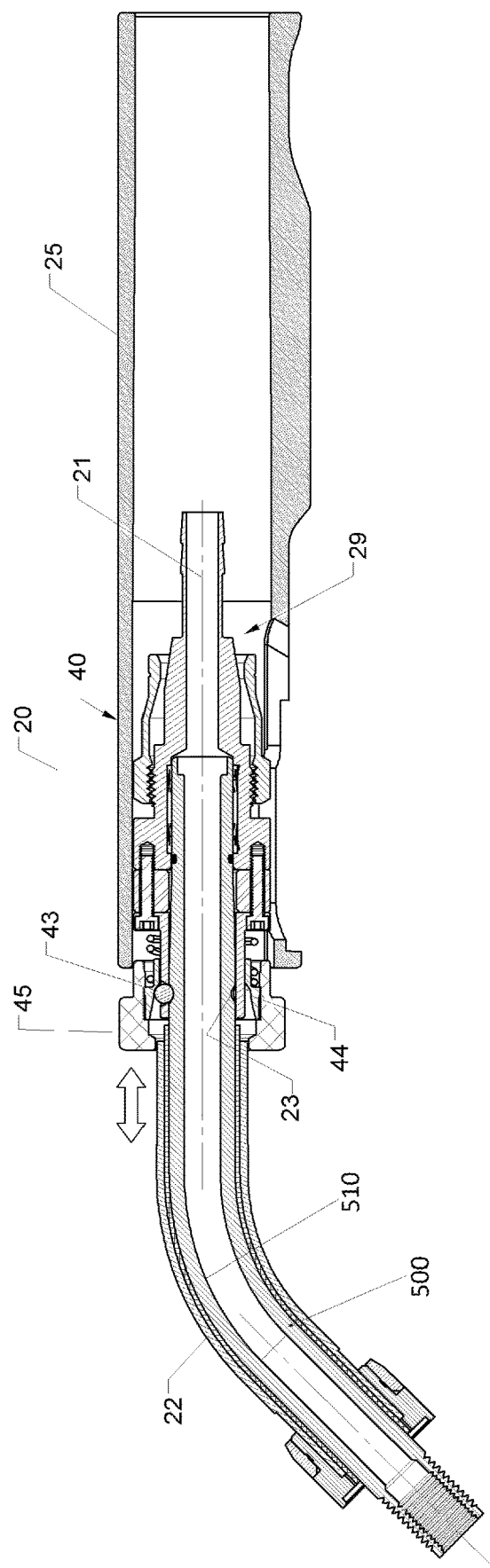
FIG. 2 is a cross section of a welding torch assembly in accordance with an embodiment of the present invention.
Figure 4:
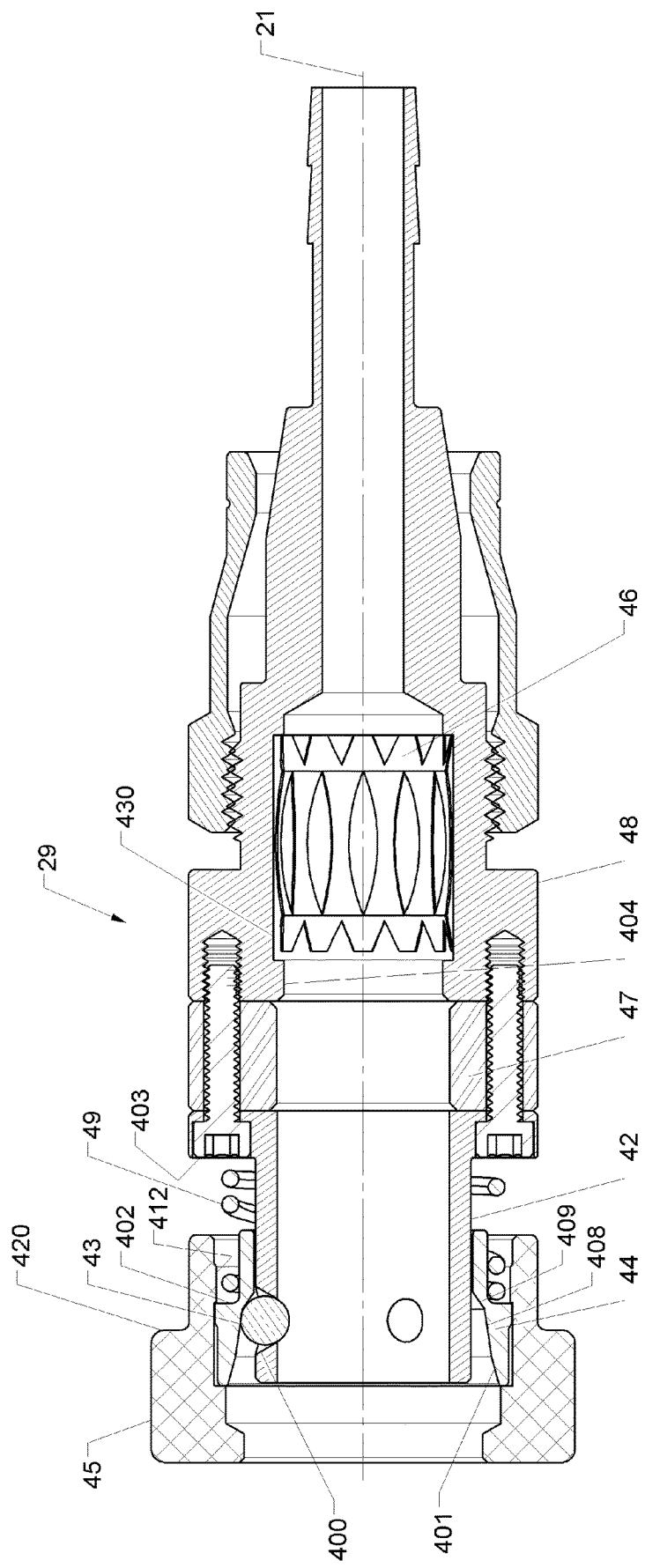
FIG. 4 is a cross section of a receiving member assembly in accordance with an embodiment of the present invention.

A cross sectional view of a welding torch assembly in accordance with an embodiment of the present invention can be seen in FIG. 2. As seen in FIG. 2, a MIG welding torch assembly 20 has a rotatable gooseneck 22 installed within a torch body 40. For clarity the uni-cable and trigger mechanism of the welding torch assembly are not shown. The rotatable gooseneck 22 is locked radially and axially about the central axis 21 by the interference produced by the metal balls 43 extending partially through the limiting members 400 of the receiving member 29 and seating in the spherical counter bores 23 of the rotatable gooseneck 22. Referring to FIG. 4, the interference member 44 has a conical and cylindrical inner diameter which, depending on the axial location of the interference member 44 relative to the central axis 21, can lock the metal balls 43 in place by the interference created by the conical inner diameter 401 of the interference member 44 and the limiting member 400 and metal balls 43. The axial position, relative to central axis 21, of the interference member 44 is forced into the locked position by a resilient member 49, in this embodiment a spring of specified spring rate that presses against a flange 402 on the interference member 44 and a flange 403 on the limiting member 400, as seen in FIG. 4. The metal balls 43, a total of 3 in this embodiment, prevent the rotation of the gooseneck 22 by extending into the spherical counter bores 23 on the distal end of the rotating gooseneck 22. Testing has found that 19.93 N-m (14.7 ft-lbs) of torque is required to overcome the resultant force generated by the resilient member 49, in this embodiment 20 ft-lbs spring. The rotating gooseneck 22 is manufactured from a softer material, in this embodiment copper, than material used to manufacture the metal balls 43, this allows for the spherical counterbores to deform or fail before the locking features of the torch body 40. The limiting member 400 and metal balls 43 are radial spaced about the central axis 21 in 120-degree increments.

As seen in FIG. 2, a release member 45 extends outside of the torch body 40 and can be pressed in the axial direction towards the distal end of the torch body 40, as indicated by the arrows. When in the locked position, as seen in FIG. 2, the release member 45 extended towards the rotatable gooseneck 22 about the central axis 21, the rotatable gooseneck 22 cannot be moved in the axial or radial directions about the central axis 21. The release member 45 is mechanically attached to the interference member 44. In this embodiment the interference member 44 is pressed into a grove within the release member 45.

Figure 3:
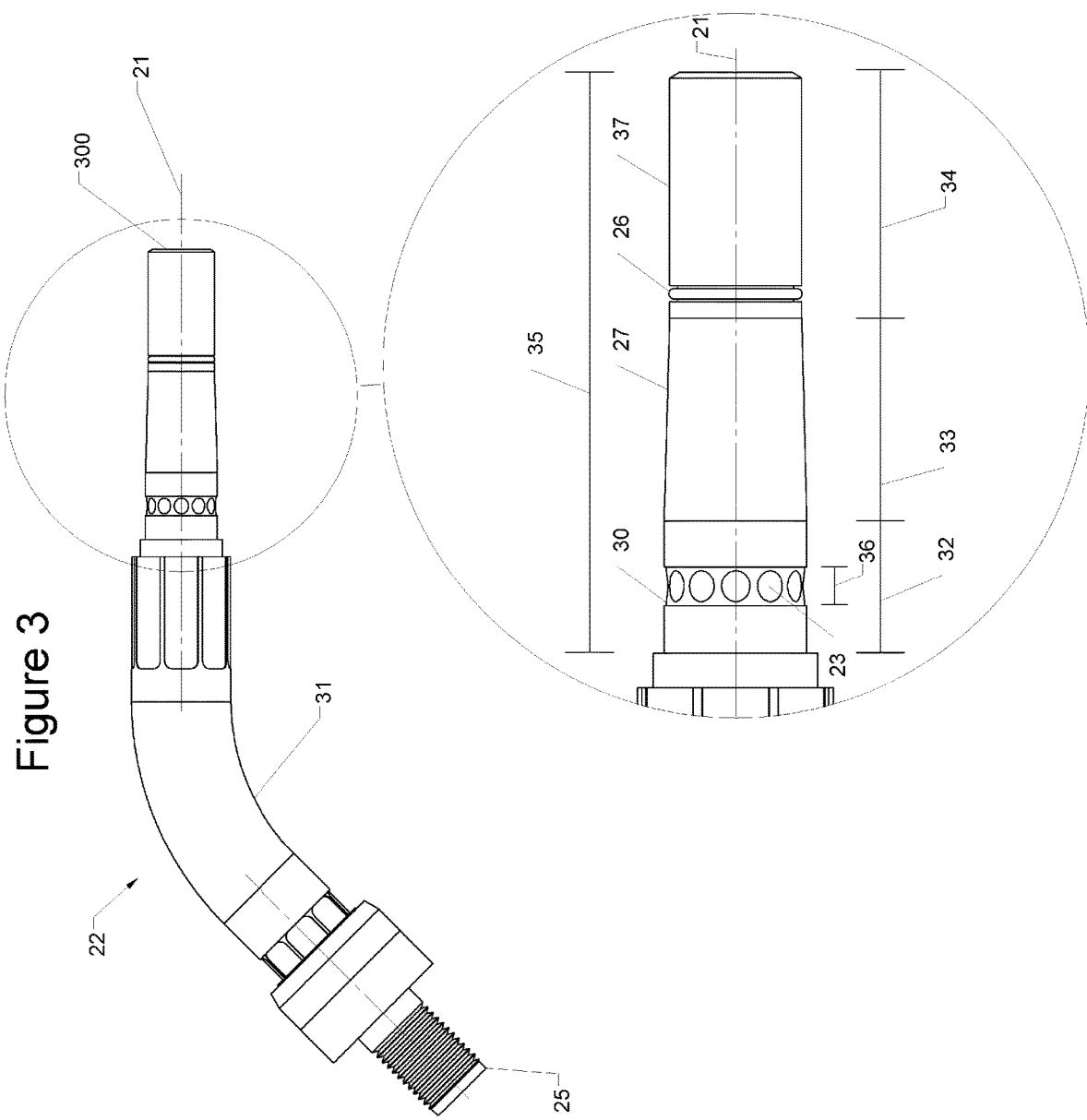
FIG. 3 is a side view of a rotatable gooseneck in accordance with an embodiment of the present invention.

An embodiment of the rotatable gooseneck 22 of the present invention can be seen in FIG. 3. The rotatable gooseneck 22 has a distal end 300 and a proximal end 25. The consumables (not shown) are installed on the proximal end 25. The distal end 300 of the rotatable gooseneck 22 comprises a combination of cylindrical and conical sections. In this embodiment, the outer diameter 37 of the cylindrical section 34 mates with the conduction member 46 of the torch body 40. There is a sealing features 26 abutting the transition from the cylindrical section 34 to the conical section 33. In this embodiment, an o-ring groove and o-ring, which prevents the leakage of the shielding gas during operation of the MIG welding torch by creating a pneumatic seal between the sealing features 26 and cylindrical section 404 of the torch body 40. The conical section 33 transitions to a cylindrical section 32. In this embodiment, cylindrical section 32 has a larger outer diameter than cylindrical section 34. Cylindrical section 32 has a series of locking features machined into the outer diameter of cylindrical section 32. An under cut 30 is machined around the outer dimeter of cylindrical section 32 such that an annular cavity 36 is created around the outer diameter of the rotatable gooseneck 22. In this embodiment, the annular cavity 36 created by undercut 30 is rectangular in shape. A series of spherical counter bores 23 are machined inside the undercut 30 in a radial pattern. The series of spherical counter bores 23 are centered, about the central axis 21, within the undercut 30. In this embodiment, there are a total of 12 spherical counter bores 23 spaced radial apart by 30 degrees, about the central axis 21, within the undercut 30. The axial length 35 of the distal end 300 of the rotatable gooseneck 22 is between 2 and 2.25 inches. The axial width 36 of the undercut 30 about the central axis 21 is 3.73 mm (0.147 inches) and the length of cylindrical section 34 is 23.6 mm (0.929 inches), the length of conical section 33 is 19.41 mm (0.764 inches), and the length of cylindrical section 32 is 12.75 mm (0.502 inches). The ratio of the width of undercut 30 to the axial length 35 of the distal end 300 of the rotatable gooseneck 22 is 0.067, the ratio of the axial length of cylindrical section 34 to the axial length 35 of the distal end 300 of the rotatable gooseneck 22 is 0.423, the ratio of the axial length of cylindrical section 32 to the axial length 35 of the distal end 300 of the rotatable gooseneck 22 is 0.229 and the ratio of the axial length of conical section 33 to the axial length 35 of the distal end 300 of the rotatable gooseneck 22 is 0.348.

Figure 6:
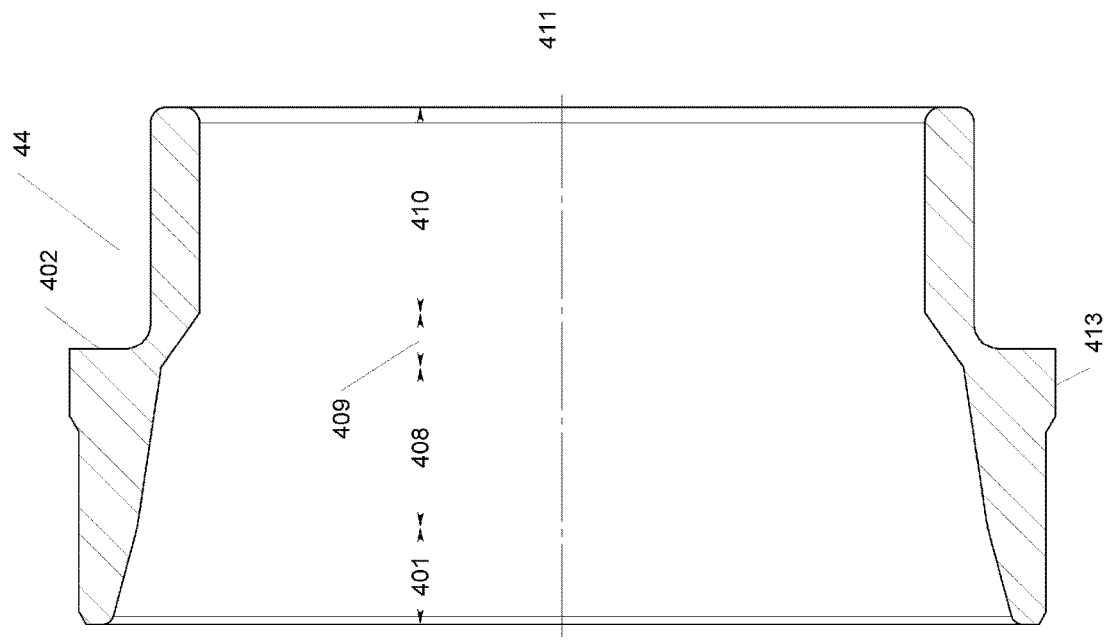
FIG. 6 is a cross section of an interference member in accordance with an embodiment of the present invention.

A receiving member 29 of welding torch body 40 in accordance with the present invention can be seen in FIG. 4. Interference section 412 is located on the inner diameter of release member 45. Interference section 412 of release member 45 has an inner diameter slightly smaller than the outer diameter of cylindrical section 413 of interference member 44, as seen in FIG. 6. As stated earlier, interference member 44 is pressed inside release member 45 to create a mechanical attachment. In this embodiment, release member 45 is machined from a non-conductive material to prevent the flow of electrical current outside of the welding torch body during the axial movement of the interference member 44. In this embodiment, the metal balls 43 are typically made from steel or stainless steel. For this reason, interference member 44 is also made from the same type of metal to prevent premature wear due to mismatch material hardness. The conduction member 46, in this embodiment, a spring conductor, does not rely on a transitional compressive force or high contact forces between cylindrical section 34 of the distal end 300 of the rotating gooseneck 22 and itself to create an electrical circuit capable of conducting at least 400 amps of current. Rather, the conduction member 46 exerts a constant radial force on the inner diameter of annular groove 430 of the receiving member 29 and cylindrical section 34 of distal end 300 of the rotatable gooseneck 22. The conduction member 46 allows the electrical connection to be independent of the locking features of the receiving member 29 and the rotating gooseneck 22. In this way, even if the welding torch assembly 20 is used as a hammer by the end user the electrical connection will not be damaged by the forced rotation of the rotatable gooseneck 22. The choice of materials will cause the locking features of the rotatable gooseneck 22, such as the spherical counter bores 23, to wear out first because of the relative softness of the copper distal end of the rotatable gooseneck 22. As the locking features of the rotatable gooseneck 22 wear, the resistance to rotation of the rotatable gooseneck 22 will reduce but the conduction member 46 will continue to provide a consistent electrical connection between the receiving member 29 of the welding torch body 40 and the rotating gooseneck 22 thereby preventing arching between the components of the welding torch assembly.

Figure 5:
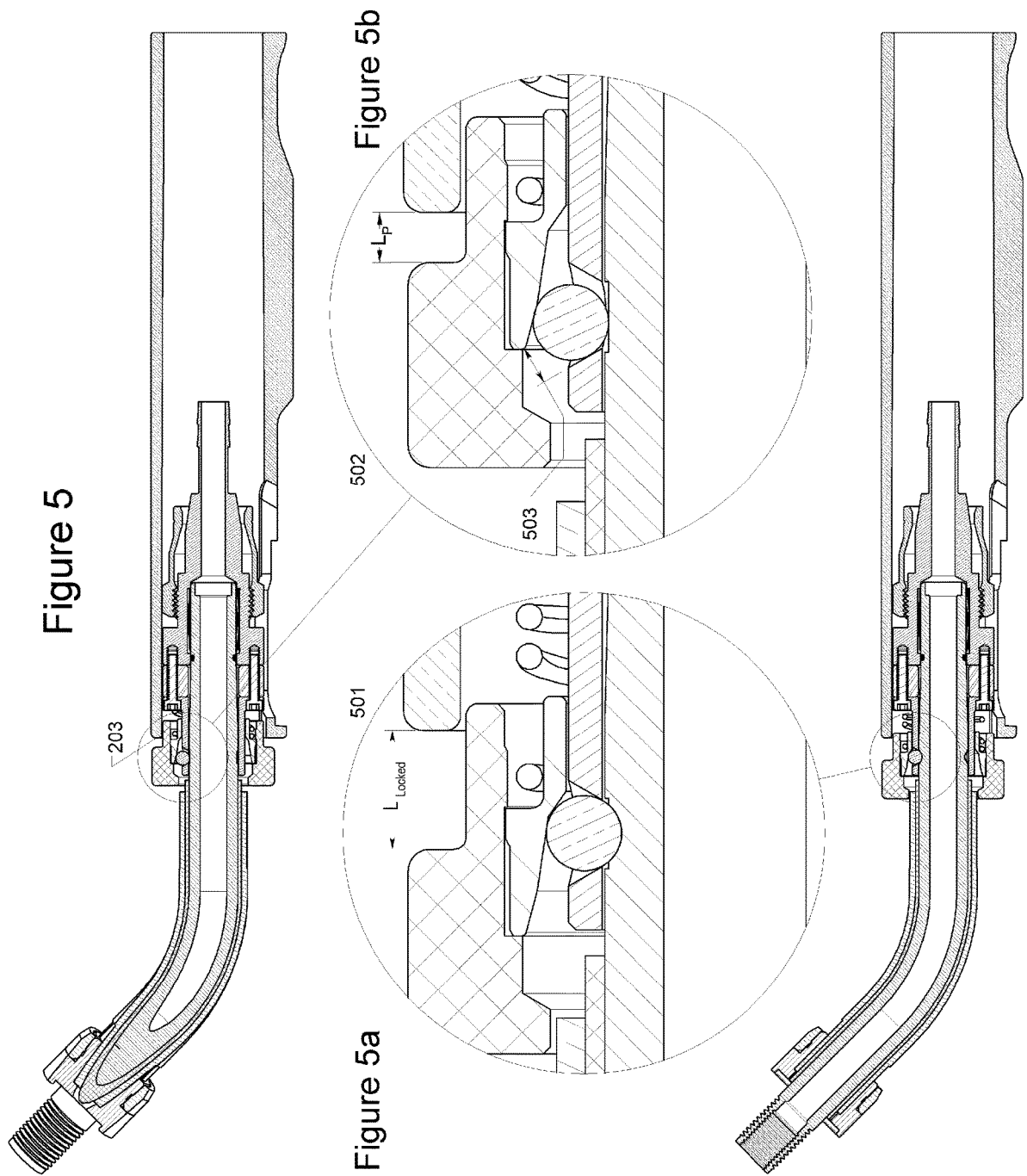
FIGS. 5a and 5b are cross sections of the embodiment seen in FIG. 2 showing the different positions of the components during the locked and partially locked states.

As seen in FIG. 5a, the spherical counter bores 23 are machined to mate with the metal balls 43 and allow for the portion of the metal balls 43 that extends through the limiting member 400 to fully seat within the spherical counter bores 23.

As seen in FIG. 6, an interference member 44, in accordance with the present embodiment of the invention, has an internal diameter that begins at the proximal end with conical section 401, transitions to conical section 408, which transitions to conical section 409, which then transitions to cylindrical section 410 that extends in the axial direction, about the central axis 411, to the distal end of the interference member 44. The cylindrical sections of the interference member 44 allow for several distinct states of interference between the limiting member 400, metal balls 43, and interference member 44 that is dependent on the axial location of the interference member 44 along the central axis 21 when assembled in receiving member 29 of the torch body 40.

Figure 7:
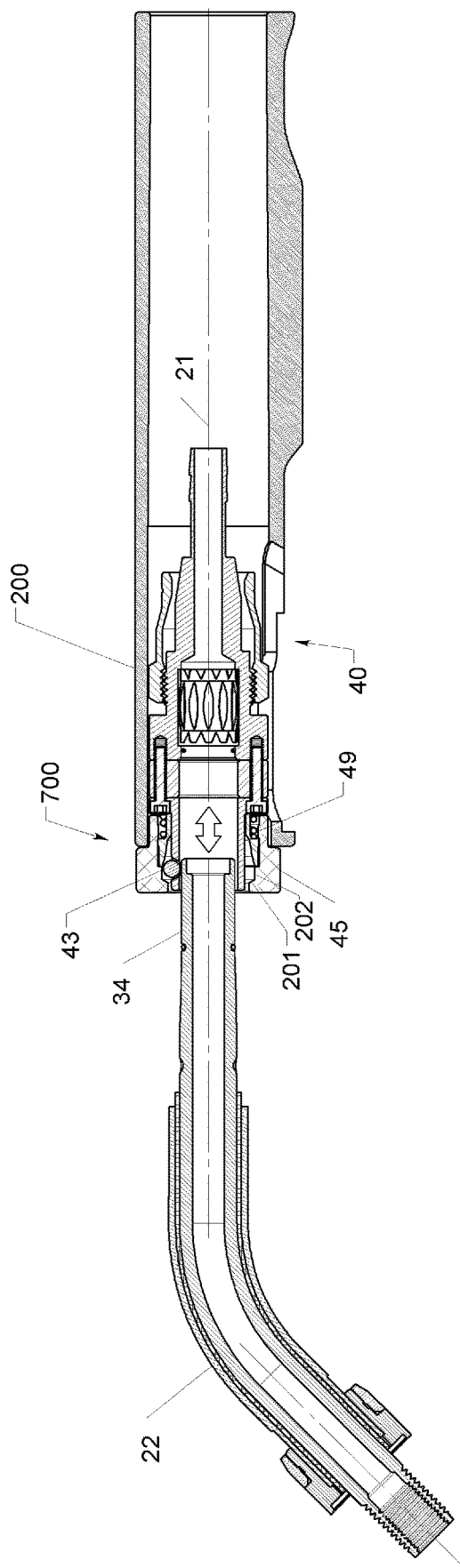
FIG. 7 is a cross section of the embodiment seen in FIG. 2 while in the unlocked state in accordance with an embodiment of the present invention.

As seen in FIG. 7, the rotatable gooseneck 22 is partially inserted into the receiving member 29 of torch body 40. This is made possible by the pressing of the release member 45 towards the distal end of the torch body 40 such that gap between the release member 45 and flange 203 handle shell 200 is minimized, as seen at abutment 700. In this embodiment, resilient member 49 requires that release member 45 be held in place at or near abutment 700 during insertion and removal of the rotatable gooseneck 22 into the receiving member 29 of torch body 40. While partially inserted, as depicted in FIG. 7, in the torch body 40 the cylindrical section 34 of the rotatable gooseneck 22 is able to mechanically push the metal balls away from the central axis 21, in the radial direction, such that the metal balls 43 are in the gap created by cylindrical section 401 of the interference member, cylindrical section 202 of the release member 45, and the limiting members 400. In this installation state, the rotatable gooseneck 22 is not constrained in the axial or radial directions about the central axis 21 of the torch body 40. The rotatable gooseneck 22 can be inserted further into the receiving member 29 of welding torch body 40 in the axial direction along the central axis 21 to a partially locked state where the metal balls 43 have entered the annular cavity 36 created by undercut 30 and is constrained by the smaller diameter portions of cylindrical section 401 of the interface member 44 and limiting member 400, see FIG. 5b. In this partially locked state, the rotatable gooseneck 22 can be rotated about the central axis 21 of the torch body 40 but cannot be pulled out of the torch body 40 because the interference member 44 prevents the metal ball form moving any further in the radial direction and the gap 503 between the proximal end of the interference member 44 and the outer diameter of the limiting member 400 is smaller than the diameter of the metal balls 43. In order to enter or maintain the partially locked state, the axial position of the release member 45 is pressed towards the torch body 40 such that the gap 502 is achieved between flange 420 of the release member 45 and flange 203 of the handle shell 200. In this embodiment, the gap 502 of the partially locked state is less than half of the gap 501 of the locked state. The amount of force needed to compress resilient member 49 into the axial length about central axis 21 required to achieve the partially locked state is less than the amount required to achieve the unlocked stated or abutment 700. In this embodiment, the gap 502, during the locked state of the torch assembly 20, is in a range between 5.00 mm (0.200 inches) to 6.35 mm (0.250 inches) which requires 35.6 N (8 lbf) of force to compress resilient member 49 such that there is no gap between flange 420 of the release member 45 and flange 203 of the handle shell 200, the fully unlocked state. The partially locked state allows for the rotatable gooseneck 22 to be rotatable without completely removing the rotatable gooseneck 22 from the torch body 40 or having to fully release the locking features of the welding torch body 40 and requires at least 28.91 N (6.5 lbf) to compress the resilient member 49 such that the metal balls 43 are allowed to move within annular cavity 36 of the distal end 300 of the rotatable gooseneck 22, thereby allowing the rotating gooseneck 22 to rotate in the radial direction about the central axis 21 but limited in the axial direction by the width annular cavity 36.

In other embodiments of the present invention, the axial moment of interference member 44 can be accomplished by mechanically sliding the interference member 44 from the lock to unlocked state alone the central axis 21 of the torch body 40.

Figure 8:
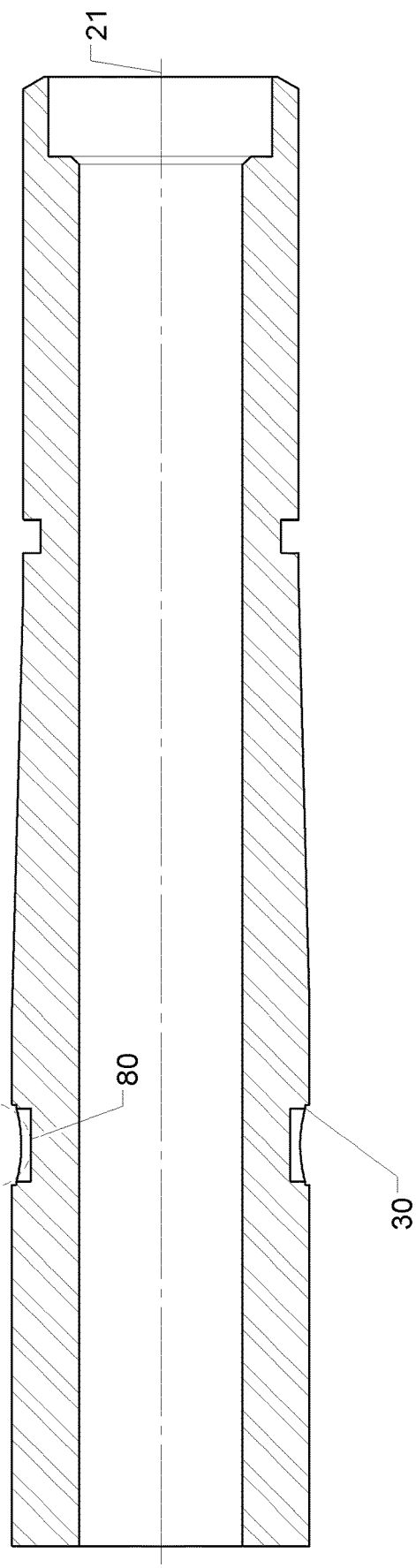
FIG. 8 is a cross section of another embodiment of the present invention with rectangular counterbores on the distal end of the rotatable gooseneck.

FIG. 8 shows another embodiment of the locking features of the rotatable gooseneck 22. In this embodiment, the counter bores 80 are rectangular in shape.

Figure 9:
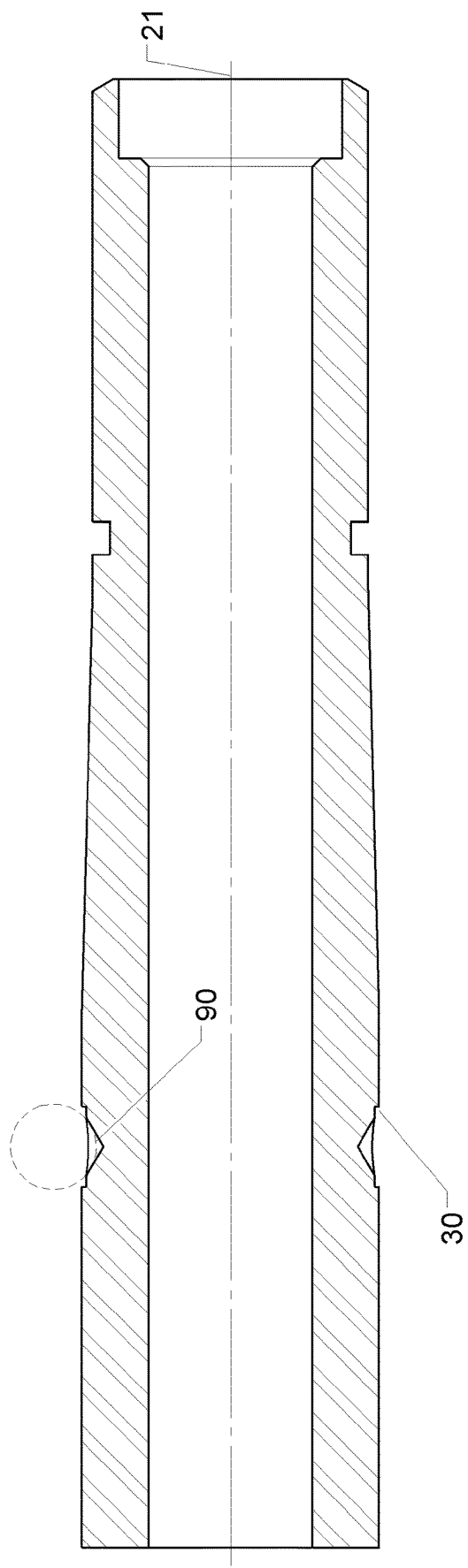
FIG. 9 is a cross section of another embodiment of the present invention with v-shaped counterbores on the distal end of the rotatable gooseneck.

FIG. 9 shows another embodiment of the locking features of the rotatable gooseneck 22. In this embodiment, the counter bores 90 are "V" shaped, as created by a drill point. The angle of drill point typically will be 30 or 60 degrees.

Figure 10:
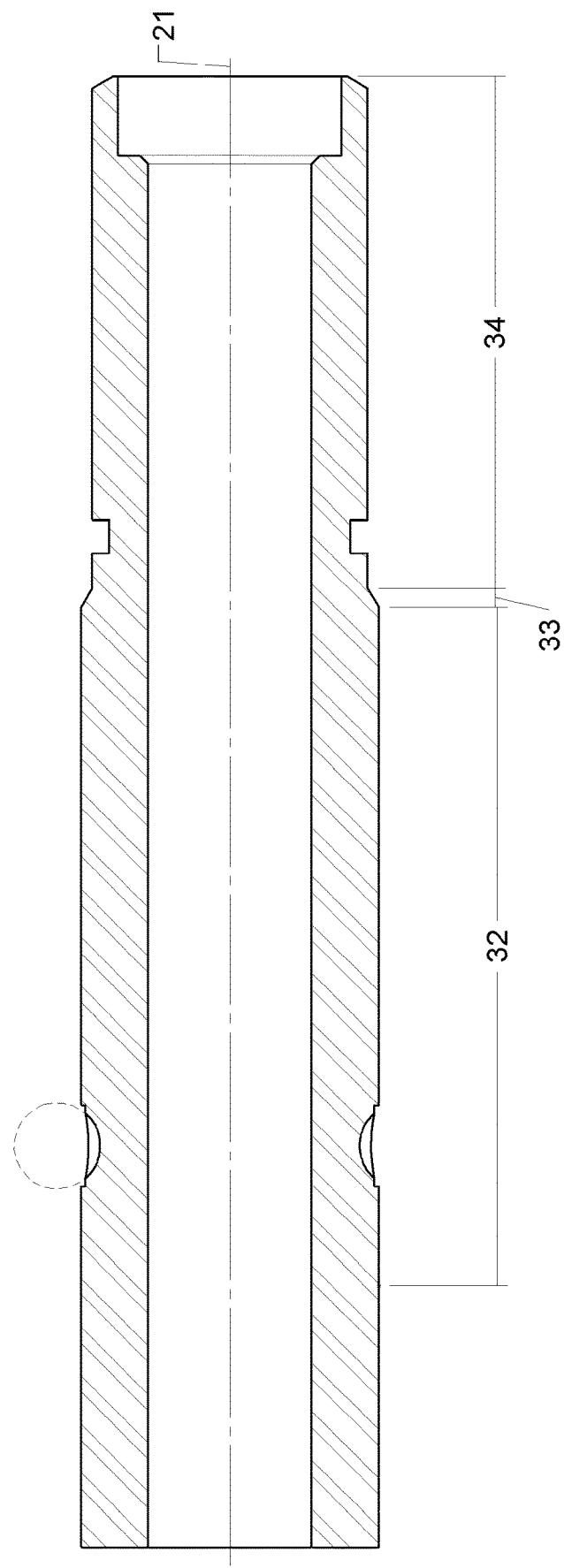
FIG. 10 is a cross section of another embodiment of the present invention with different length ratios between the cylindrical and conical sections of the distal end of the rotatable gooseneck.

FIG. 10 shows another embodiment of the locking features of the rotatable gooseneck 22. In this embodiment, conical section 33 is shorter.

Figure 11:
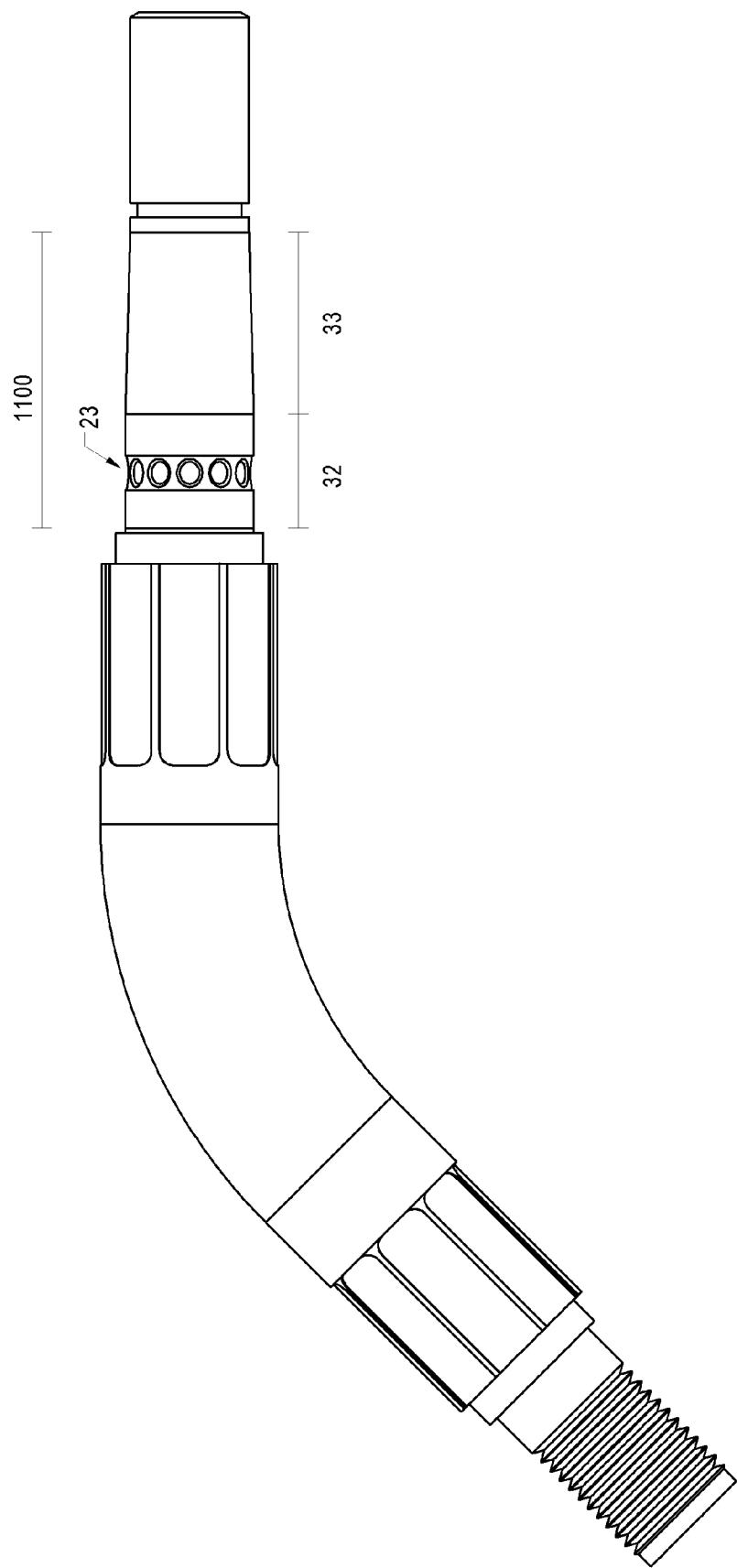
FIG. 11 is a side view of another embodiment of the present invention that includes a metal sleeve that includes the locking features of the rotatable gooseneck.

FIG. 11 shows another embodiment of the locking features of the rotatable gooseneck 22. In this embodiment, cylindrical section 32 and conical section 33 of the distal end 300 of the rotatable gooseneck 22 are part of a metal sleeve 1100 that is slid over outer diameter 37 of the distal end 300 of the rotatable gooseneck 22 and is mechanically attached or bonded to the distal end 300. The metal sleeve 1100 can made from copper, steel, stainless steel, brass or other suitable metal or composite. The metal sleeve 1100 is attached or bonded to the rotatable gooseneck 22 such that at least 20 N-M (15 ft-lb) will not overcome the mechanical attachment or bonding, thereby causing rotation of metal sleeve 1100 about the central axis 21 relative to the distal end 300 of the rotating gooseneck 22. Bonding can include methods such as welding, brazing, and adhesives.

Figure 12:
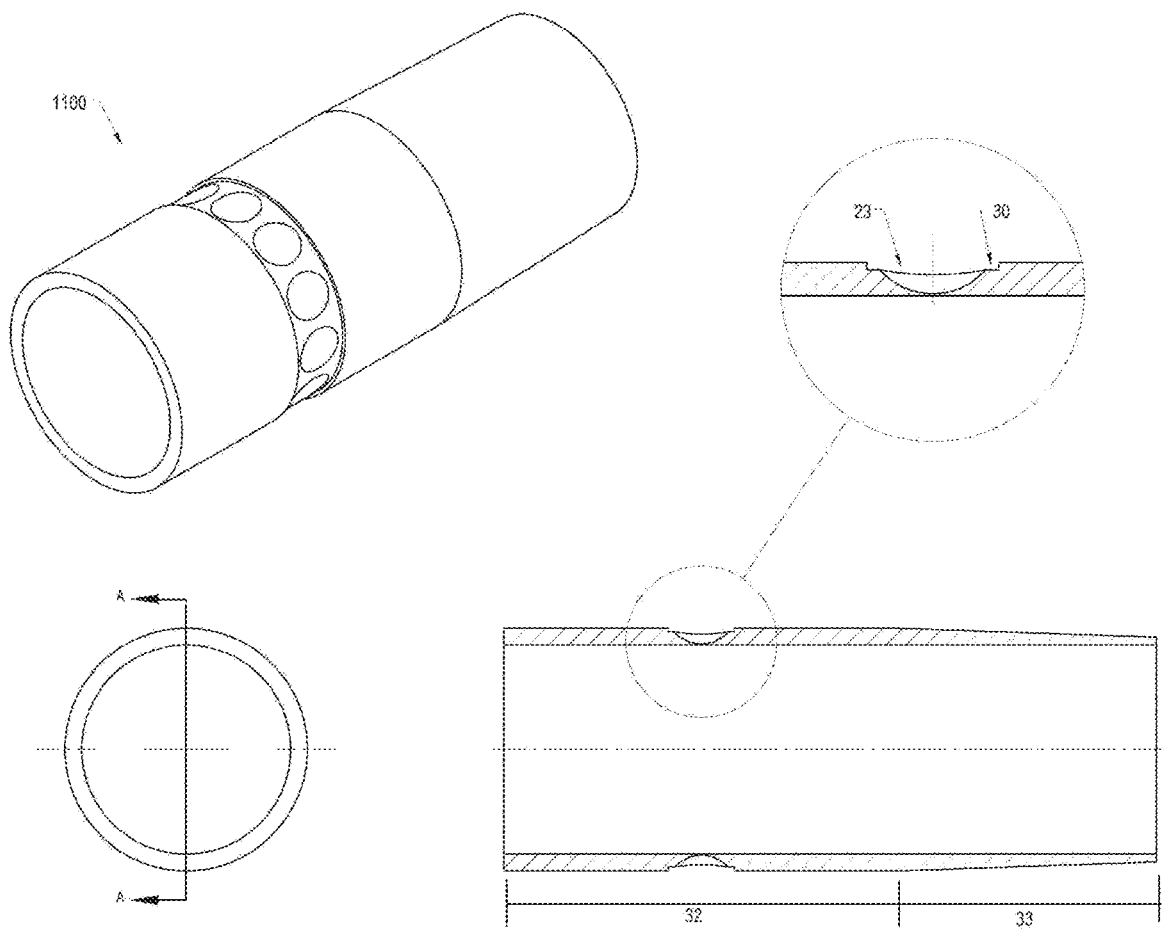
FIG. 12 is a metal sleeve in accordance with an embodiment of the present invention that includes a cylindrical and conical section.

In one embodiment of the metal sleeve 1100, as seen in FIG. 11 and FIG. 12, the metal sleeve 1100 includes a cylindrical section 32 and conical section 33. The metal sleeve 1100 can have a series of spherical counter bores 23 machined into the undercut 30 of the metal sleeve 1100. The metal sleeve 1100 is hollow and depending on the wall thickness of metal sleeve 1100, the spherical counter bores 23 can extend all the way through the metal sleeve 1100, as seen in FIG. 13, or the outer diameter of cylindrical section 32 can be adjusted to prevent the spherical counter bores 23 from extending through the metal sleeve 1100, as seen in FIG. 12.

Figure 13:
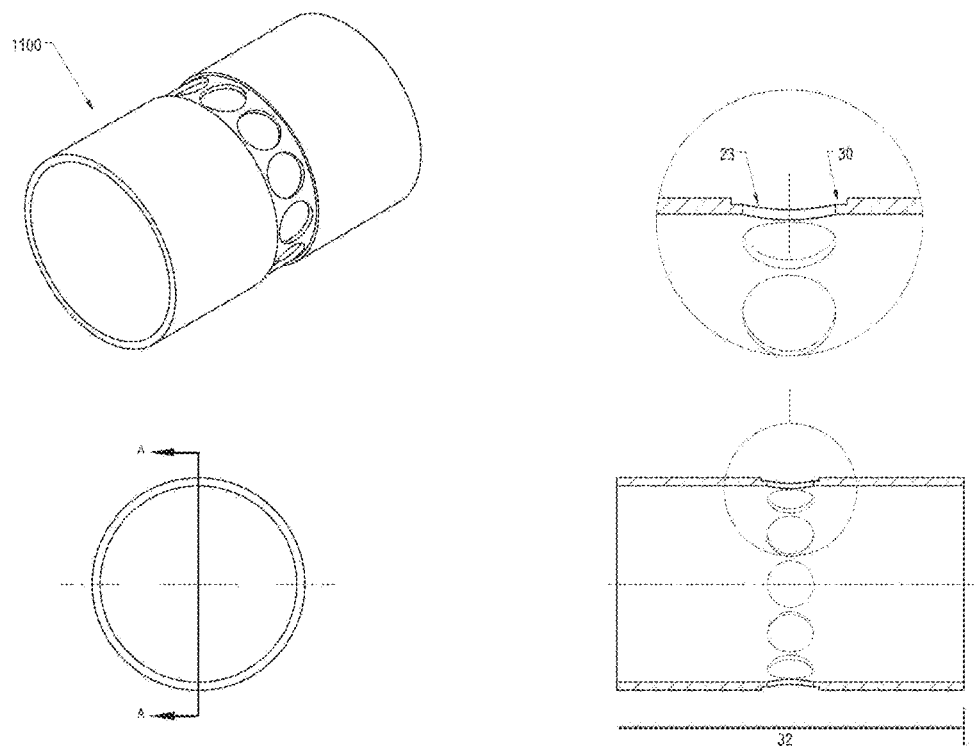
FIG. 13 is a metal sleeve in accordance with an embodiment of the present invention that includes a cylindrical section.
Figure 14:
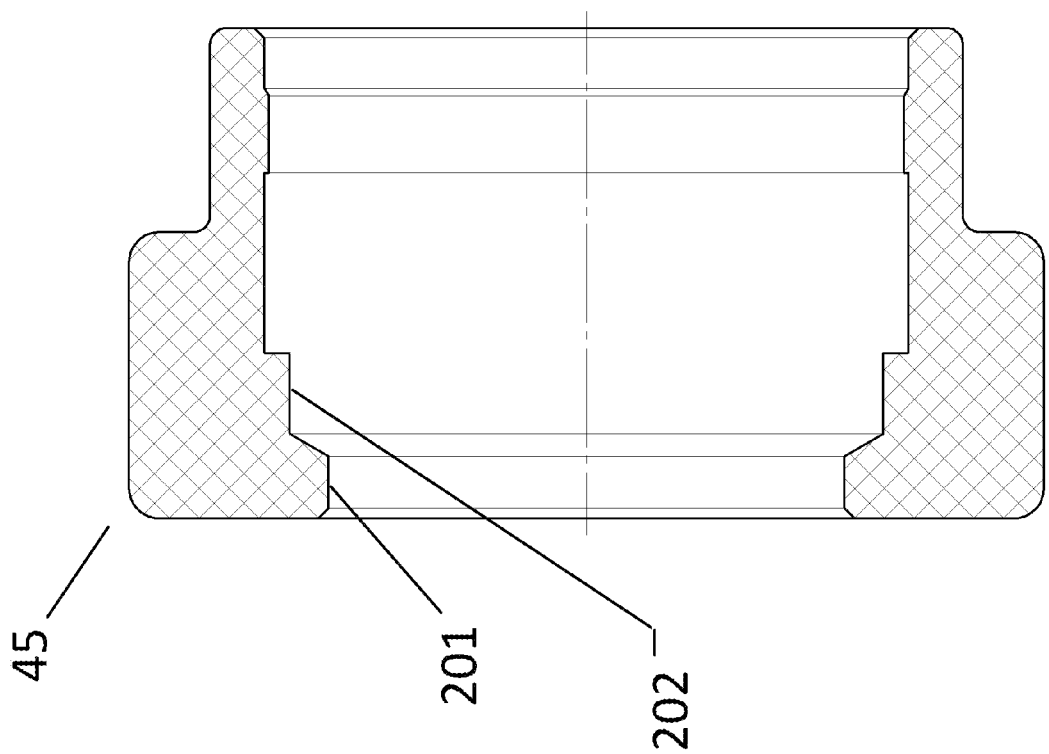
FIG. 14 is a cross section of a release member in accordance with an embodiment of the present invention.

In another embodiment of the metal sleeve 1100, as seen in FIG. 13, the metal sleeve 1100 only includes cylindrical section 32. The metal sleeve 1100 can have a series of spherical counter bores 23 machined into undercut 30 of the metal sleeve 1100. The metal sleeve 1100 is hollow and depending on the wall thickness of metal sleeve 1100, the spherical counter bores 23 can extend all the way through the metal sleeve 1100, as seen in FIG. 13, or the outer diameter of cylindrical section 32 can be adjusted to prevent the spherical counter bores 23 from extending through the metal sleeve 1100, as seen in FIG. 12.

The following paragraphs describe various embodiments disclosed herein.

A first embodiment of a rotatable gooseneck adapted for use in a welding torch includes a distal and a proximal end, a central axis that extends from the distal end to the proximal end of the rotatable goose neck, a tubular electrical connection on the distal end of the rotatable goose neck, a plurality of locking features adjacent to the tubular electrical connection, wherein the distal end of the rotatable goose neck is configured to be inserted in to a torch body and the locking feature prevents the goose neck from moving in the axial and radial directions about the central axis of the goose neck when installed in the torch body.

A subsequent embodiment of the rotatable gooseneck, including the first or any subsequent embodiment of the rotatable gooseneck, wherein the rotatable gooseneck may further include a sealing feature adjacent to the plurality of locking features.

A subsequent embodiment of the rotating gooseneck including any of the first or subsequent embodiments of the rotatable gooseneck, wherein the rotatable gooseneck may further include the feature of the plurality of locking features including a plurality of counter bores.

A subsequent embodiment of the rotating gooseneck including any of the first or subsequent embodiments of the rotatable gooseneck, wherein the plurality of counter bores are spherical in shape.

A subsequent embodiment of the rotating gooseneck including any of the first or subsequent embodiments of the rotatable gooseneck, wherein the plurality of locking features further comprises an undercut that creates an annular cavity at the axial location of the plurality of locking features.

A subsequent embodiment of the rotating gooseneck including any of the first or subsequent embodiments of the rotatable gooseneck, wherein the plurality of counter bores are axially centered within the undercut and concentrically spaced about the central axis of the rotatable goose neck.

A subsequent embodiment of the rotating gooseneck including any of the first or subsequent embodiments of the rotatable gooseneck, wherein the plurality of counter bores are radially spaced at 30 degree intervals about the central axis of the gooseneck.

A first embodiment of a welding torch body, wherein the welding torch body includes a distal and a proximal end, a receiving member on the proximal end of the welding torch body, a central axis of the receiving member, a plurality of locking members, an electrical connection, a release member, wherein the receiving member of the welding torch body is configured to receive a lockable gooseneck, when installed in the receiving member the lockable gooseneck: is prevented from movement in the axial and radial directions about the central axis of the receiving member by the plurality of locking members, and provided an electrical connection between the lockable gooseneck and welding torch via the electrical connection; and by axial movement of the release member about the central axis of the receiving member the plurality of locking members can restore radial and axial movement to the lockable gooseneck.

A subsequent embodiment of the welding torch body, including the first or any subsequent embodiment of the welding torch body, wherein the plurality of locking members comprises a plurality of metal spheres.

A subsequent embodiment of the welding torch body, including any of the first or subsequent embodiments of the welding torch body, wherein the welding torch body further includes a limiting member.

A subsequent embodiment of the welding torch body, including any of the first or subsequent embodiments of the welding torch body, wherein the welding torch body further includes an interference member.

A subsequent embodiment of the welding torch body, including any of the first or subsequent embodiments of the welding torch body, wherein the interference member is mechanically attached to the release member.

A subsequent embodiment of the welding torch body, including any of the first or subsequent embodiments of the welding torch body, wherein the plurality of metal spheres are positioned in-between the limiting member and the interference member and the interference member has a locked position and a unlocked position whereby movement of the release member will cause the release member to transition from the locked position to the unlocked position and vise versa.

A subsequent embodiment of the welding torch body, including any of the first or subsequent embodiments of the welding torch body, wherein the interference member has a partially locked state that allows for the rotation of the lockable gooseneck without moving the interference member into the unlocked position.

A first embodiment of a welding torch assembly, wherein the welding torch assembly includes a central axis of the welding torch assembly, a rotatable gooseneck, the rotatable gooseneck including a distal and a proximal end, a tubular electrical connection on the distal end of the rotatable gooseneck, a plurality of locking features adjacent to the tubular electrical connection, a welding torch body, the welding torch body including a distal and a proximal end, a receiving member on the proximal end of the welding torch body, a plurality of locking members, an electrical connection, and a release member, wherein the distal end of the rotatable goose neck is configured to be inserted into the receiving member of the welding torch body and the locking features of the rotatable gooseneck prevents the rotatable gooseneck from moving in the axial and radial directions about the central axis of the welding torch assembly when the rotatable gooseneck is installed in the welding torch body, and the receiving member of the welding torch body is configured to receive the distal end of the rotatable gooseneck, when installed in the receiving member the rotatable gooseneck is prevented from movement in the axial and radial directions about the central axis of the welding torch assembly by the plurality of locking members of the welding torch body, and an electrical circuit is completed between the rotatable gooseneck and welding torch body via the electrical connection of the welding torch body and the tubular electrical connection of the rotatable gooseneck; and by axial movement of the release member about the central axis of the welding torch assembly the plurality of locking members of the welding torch body can restore radial and axial movement to the rotatable gooseneck.

A subsequent embodiment of the welding torch assembly, including the first or any subsequent embodiment of the welding torch assembly, wherein the rotatable gooseneck further includes a sealing feature adjacent to the plurality of locking features.

A subsequent embodiment of the welding torch assembly, including any of the first or subsequent embodiments of the welding torch assembly, wherein the plurality of locking features of the rotatable gooseneck includes a plurality of counter bores.

A subsequent embodiment of the welding torch assembly, including any of the first or subsequent embodiments, wherein the plurality of counter bores of the rotatable gooseneck are spherical in shape.

A subsequent embodiment of the welding torch assembly, including any of the first or subsequent embodiments of the welding torch assembly, wherein the plurality of locking features of the rotatable gooseneck further includes an undercut that creates an annular cavity at the axial location of the plurality of locking features.

A subsequent embodiment of the welding torch assembly, including any of the first or subsequent embodiments of the welding torch assembly, wherein the plurality of counter bores of the rotatable gooseneck are axially centered within the undercut and concentrically spaced about the central axis of the welding torch assembly.

A subsequent embodiment of the welding torch assembly, including any of the first or subsequent embodiments of the welding torch assembly, wherein the plurality of counter bores of the rotatable gooseneck are radially spaced at 30 degree intervals about the central axis of the welding torch assembly.

A subsequent embodiment of the welding torch assembly, including any of the first or subsequent embodiments of the welding torch assembly, wherein the plurality of locking members of the welding torch body include a plurality of metal spheres.

A subsequent embodiment of the welding torch assembly, including any of the first or subsequent embodiments of the welding torch assembly, wherein the welding torch body further includes a limiting member.

A subsequent embodiment of the welding torch assembly, including any of the first or subsequent embodiments of the welding torch assembly, wherein the welding torch body further includes an interference member.

A subsequent embodiment of the welding torch assembly, including any of the first or subsequent embodiments of the welding torch assembly, wherein the interference member of the welding torch body is mechanically attached to the release member.

A subsequent embodiment of the welding torch assembly, including any of the first or subsequent embodiments of the welding torch assembly, wherein the plurality of metal spheres of the welding torch body are positioned in-between the limiting member and the interference member and the interference member has a locked position and a unlocked position whereby movement of the release member will cause the release member to transition from the locked position to the unlocked position and vise versa.

A subsequent embodiment of the welding torch assembly, wherein the interference member of the welding torch body has a partially locked stated that allows for the rotation of the lockable gooseneck without moving the interference member into the unlocked position.

What is claimed is:

1. A rotatable gooseneck for use in a MIG welding torch of the type having a tubular shaped torch body with a receiving member formed therein, the receiving member including a receiving bore having a conductive bore surface extending there along, into which bore an end of the rotatable gooseneck is receivable to effect operation of the torch, the rotatable gooseneck comprising:
    a tubular segment having a gooseneck shape and first and second ends extending along a central axis thereof, the tubular segment including a cylindrically shaped electrically conductive gooseneck surface along the first end which surface is insertable within the receiving bore along the conductive bore surface for electrical contact and communication therewith; and
    a plurality of locking features adjacent the cylindrical electrical connection; comprising a plurality of counter bores and an undercut that creates an annular cavity at the axial location of the plurality of locking features, with the counter bores axially centered within the undercut and concentrically spaced about the central axis of the rotatable goose neck,
    wherein the central axis of the tubular segment is concentric with respect to an inner surface of the rotatable gooseneck and remains concentric with respect to the inner surface in a radial cross section of the rotatable gooseneck that is perpendicular to the inner surface, wherein the first end of the rotatable gooseneck is configured to be inserted into the torch body and the plurality of locking features prevent the rotatable gooseneck from moving in the axial and radial directions about the central axis of the rotatable gooseneck when installed in the body torch wherein, when the tubular segment of the rotatable gooseneck is at least partially inserted into the receiving member of the torch body, an outer surface of the rotatable gooseneck is in electrical communication with an inner surface of the receiving member, and
    an electrical circuit between the rotatable gooseneck and the torch body is completed independent of the plurality of locking features of the rotatable gooseneck when installed in the torch body and prior to engagement of the plurality of locking features.

2. The rotatable gooseneck of claim 1 further comprising a sealing feature adjacent to the plurality of locking features which creates a pneumatic seal during operation.

3. The rotatable gooseneck of claim 1 wherein each in the plurality of counter bores is spherical in shape.

4. The rotatable gooseneck of claim 1 wherein the plurality of counter bores are radially spaced at 30 degree intervals about the central axis of the gooseneck.

5. A welding torch body for use in MIG welding, comprising:
    distal and proximal ends extending along a central axis;
    a receiving member on the proximal end of the welding torch body, the receiving member including a receiving bore having a conductive bore surface extending there along, into which bore an end of the rotatable gooseneck can be received;
    a tubular segment having a gooseneck shape and first and second ends extending along a central axis thereof wherein, when the tubular segment of the rotatable gooseneck is at least partially inserted into the receiving member, an outer surface of the rotatable gooseneck is in electrical communication with an inner surface of the receiving member;
    a plurality of locking members comprising a plurality of counter bores and an undercut that creates an annular cavity at the axial location of the plurality of locking features, with the counter bores axially centered within the undercut and concentrically spaced about the central axis of the rotatable goose neck;;
    an electrical connection; and
    a release member, wherein:
    when installed in the receiving member the lockable gooseneck is prevented from movement in the axial and radial directions about the central axis of the receiving member by the plurality of locking members;
    an electrical circuit is provided between the lockable gooseneck and welding torch via the electrical connection;
    by axial movement of the release member about the central axis of the receiving member, the plurality of locking members can restore radial and axial movement to the lockable gooseneck; and
    the electric circuit between the lockable gooseneck and the welding torch body is completed independent of the plurality of locking members and the release member and prior to engagement of the plurality of locking members, wherein the release member extends outside of the torch body and can be pressed in the axial direction toward the distal end of the torch body.

6. The welding torch body of claim 5 wherein the plurality of locking members comprises a plurality of metal spheres.

7. The welding torch body of claim 6 further comprising a limiting member.

8. The welding torch body of claim 7 further comprising an interference member.

9. The welding torch body of claim 8 wherein the interference member is mechanically attached to the release member.

10. The welding torch body of claim 9 wherein each in the plurality of metal spheres is positioned in-between the limiting member and the interference member and the interference member has a locked position and an unlocked position whereby movement of the release member will cause the release member to transition from the locked position to the unlocked position and vice versa.

11. The welding torch body of claim 10 wherein the interference member has a partially locked stated that allows for the rotation of the lockable gooseneck without moving the interference member into the unlocked position.

12. A welding torch assembly for use in MIG welding comprising:
a rotatable gooseneck comprising a tubular segment having a gooseneck shape and first and second ends extending along a central axis thereof, and a plurality of locking features adjacent the tubular segment, the plurality of locking features comprising a plurality of counter bores and an undercut that creates an annular cavity at the axial location of the plurality of locking features, with the counter bores axially centered within the undercut and concentrically spaced about the central axis of the rotatable gooseneck;
a welding torch body comprising distal and aproximal body ends;
a combination of a receiving member on the proximal body end, a plurality of locking members, an electrical connection, and a release member,
wherein the receiving member comprises a receiving bore having a conductive bore surface extending there along, into which bore an end of the rotatable gooseneck can be received;
wherein, when the tubular segment of the rotatable gooseneck is at least partially inserted into the receiving member, an outer surface of the rotatable gooseneck is in electrical communication with an inner surface of the receiving member, and wherein the locking features of the rotatable gooseneck prevents the rotatable gooseneck from moving in the axial and radial directions about the central axis of the welding torch assembly when the rotatable gooseneck is installed in the welding torch body, and the receiving member of the welding torch body is configured to receive a distal end of the rotatable gooseneck, and wherein an electrical circuit is completed between the rotatable gooseneck and the welding torch body via the electrical connection of the welding torch body and the tubular electrical connection of the rotatable gooseneck; and by axial movement of the release member about the central axis of the welding torch assembly the plurality of locking members of the welding torch body can restore radial and axial movement to the rotatable gooseneck; and
wherein the electrical circuit between the tubular electrical connection of the rotatable gooseneck and the electrical connection of the welding torch body is completed independent of the plurality of locking members and the release member and prior to engagement of the plurality of locking members.

13. The welding torch assembly of claim 12 wherein the electrical circuit between the tubular electrical connection of the rotatable gooseneck and the electrical connection of the welding torch body is capable of conducting at least 400 amps of current.

14. The welding torch assembly of claim 10 wherein the plurality of counter bores are spherical in shape.

15. The welding torch assembly of claim 14 wherein counter bores in the plurality of counter bores are radially spaced at 30 degree intervals about the central axis of the welding torch assembly.

16. The welding torch assembly of claim 12 wherein the plurality of locking features comprises a plurality of metal spheres.

17. The welding torch assembly of claim 16 further comprising a limiting member.

18. The welding torch assembly of claim 17 further comprising an interference member.

19. The welding torch assembly of claim 18 wherein the interference member is mechanically attached to the release member.

20. The welding torch assembly of claim 19 wherein the plurality of metal spheres is positioned in-between the limiting member and the interference member and the interference member has a locked position and an unlocked position whereby movement of the release member will cause the release member to transition from the locked position to the unlocked position and vice versa.

21. The welding torch assembly of claim 20, wherein the interference member has a partially locked stated that allows for the rotation of the lockable gooseneck without moving the interference member into the unlocked position.

22. A method of operating a MIG welding torch assembly comprising a central axis, a rotatable gooseneck and a welding torch body, the rotatable gooseneck comprising a proximal end, a distal end, a tubular segment having a gooseneck shape and first and second ends extending along a central axis thereof, the tubular segment including a cylindrically shaped electrically conductive gooseneck surface along the first end which surface is insertable within the receiving bore along the conductive bore surface for electrical contact and communication therewith, and a plurality of locking features comprising a plurality of counter bores and an undercut that creates an annular cavity at the axial location of the plurality of locking features, with the counter bores axially centered within the undercut and concentrically spaced about the central axis of the rotatable goose neck, the welding torch body comprising, a proximal end, a distal end, an electrical conduction member, a plurality of locking members, and a release member, the method comprising the steps of:
unlocking the plurality of locking members of the welding torch body, inserting the rotatable gooseneck into the welding torch body along the central axis and completing an electrical connection by bringing the electrical conduction section of the rotatable gooseneck and the conduction member of the welding torch body into mechanical communication, during, before or after insertion of the rotatable gooseneck, rotating the rotatable gooseneck about the central axis to achieve a desired radial orientation, locking the rotatable gooseneck in the radial and axial directions wherein, when the tubular segment of the rotatable gooseneck is at least partially inserted into a receiving member of the torch body, an outer surface of the rotatable gooseneck is in electrical communication with an inner surface of the receiving member.

23. The method of using a welding torch assembly of claim 22, wherein the welding torch body is locked and unlocked by axial movement of the release member about the central axis.

24. The method of using a welding torch assembly of claim 22, wherein the electrical connection between the electrical conduction section of the rotatable gooseneck and the conduction member of the welding torch body is achieved by inserting the distal end of the rotatable gooseneck into the proximal end of the welding torch body to a predefined insertion depth.

25. The method of using a welding torch assembly of claim 22 wherein the electrical connection between the electrical conduction section of the rotatable gooseneck and the conduction member of the welding torch body is maintained during the rotation of the rotatable gooseneck about the central axis.

* * * * *